United States Patent
DiMaio et al.

(10) Patent No.: US 6,218,331 B1
(45) Date of Patent: *Apr. 17, 2001

(54) POLYMER-SUPPORTED CATALYST FOR OLEFIN POLYMERIZATION

(75) Inventors: Anthony-J. DiMaio, Woodbury, CT (US); Craig C. Meverden, Mason, OH (US); Peter D. Becker, Loveland, OH (US)

(73) Assignee: Equistar Chemicals, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/884,401

(22) Filed: Jun. 27, 1997

Related U.S. Application Data

(63) Continuation-in-part of application No. 08/774,594, filed on Dec. 30, 1996, which is a continuation of application No. 08/412,679, filed on Mar. 29, 1995, now abandoned.

(51) Int. Cl.[7] ................. C08F 4/02; C08F 4/42
(52) U.S. Cl. ............ 502/109; 526/904; 526/124.3
(58) Field of Search ............... 502/109; 526/904

(56) References Cited

U.S. PATENT DOCUMENTS

| | | | |
|---|---|---|---|
| 4,098,979 | * 7/1978 | Maemoto et al. | ............... 526/904 |
| 4,173,547 | 11/1979 | Graff . | |
| 4,268,418 | 5/1981 | Hoff . | |
| 4,404,343 | * 9/1983 | Hoff | ................... 526/142 |
| 4,407,727 | 10/1983 | Harris et al. . | |
| 4,568,730 | 2/1986 | Graves . | |
| 4,900,706 | 2/1990 | Sasaki et al. . | |
| 5,051,484 | 9/1991 | Sasaki et al. . | |
| 5,118,648 | 6/1992 | Furtek et al. . | |
| 5,275,993 | 1/1994 | Fujita et al. . | |
| 5,409,875 | * 4/1995 | Hsu et al. | ............... 526/904 |
| 5,587,439 | * 12/1996 | DiMaio | ............... 526/904 |

FOREIGN PATENT DOCUMENTS

| | | | |
|---|---|---|---|
| 0 283 011 | 9/1988 | (EP) . | |
| 0 375 199 | 6/1990 | (EP) . | |
| 0 523 879 | 1/1993 | (EP) . | |
| 0 539 937 | 5/1993 | (EP) . | |
| 1235062 | * 6/1971 | (GB) | ............... 526/151 |
| WO 93/00373 | 1/1993 | (WO) . | |
| WO96/30122 | * 10/1996 | (WO) . | |

OTHER PUBLICATIONS

Y. Guangqian, et al., "Synthesis and Characterization of Polymer–Supported Lanthanide Complexes and Butadiene Polymerization Based on Them", *Macromolecules,* 26, pp. 6702–6705 (1993).

J.C. Bailly, "Use of Image Analysis for the Knowledge and Control of Polymer and Ziegler–Natta Catalyst Granulometry", *Polymer,* 32, pp. 181–190 (1991).

R.E. Hoff, et al. "Alcohol–Modified Magnesium Titanium Catalysts", *Advances in Polyolefins,* p. 241, 1987.

* cited by examiner

*Primary Examiner*—Donald R. Wilson
*Assistant Examiner*—R. Rabago
(74) *Attorney, Agent, or Firm*—Gerald A. Baracka; Johnathan L. Schuchardt

(57) ABSTRACT

The present invention is directed to a process of preparing a novel supported Ziegler-Natta catalyst useful for the polymerization of α-olefins. More specifically, the supported Ziegler-Natta catalyst of the present invention comprises a particulate functionalized copolymeric support, at least one organometallic compound or complex and at least one transition metal compound. A novel method of preparing the particulate functionalized copolymeric support of the instant invention is also provided.

19 Claims, No Drawings

US 6,218,331 B1

POLYMER-SUPPORTED CATALYST FOR OLEFIN POLYMERIZATION

RELATED APPLICATIONS

This application is a continuation-in-part of U.S. Ser. No. 08/774,594, filed Dec. 30, 1996 which is a continuation application of U.S. Ser. No. 08/412,679, filed Mar. 29, 1995, now abandoned.

BACKGROUND OF THE INVENTION

1. Field of the Invention

The present invention relates to a process of preparing a novel supported Ziegler-Natta catalyst and catalyst system useful for polymerizing or copolymerizing α-olefins. In one embodiment, the supported Ziegler-Natta catalyst of the present invention is obtained by contacting a particulate functionalized olefin copolymer support with an organometallic compound, complex or mixture thereof under conditions effective to prepare a catalyst precursor material; washing the catalyst precursor; optionally, contacting the washed catalyst precursor with an alcohol; and then contacting that product with at least one transition metal or transition metal-containing compound to obtain the supported catalyst. In another embodiment, the washing step is omitted and the unwashed precursor material is contacted with an alcohol.

A highly preferred organometallic compound employed in the present invention is a combination of an alkyl magnesium compound or complex and an alkyl aluminum halide compound. Supported catalysts prepared in accordance with the process of the present invention exhibit high catalytic activity as well as produce polymers which have improved physical properties which are hereinbelow described.

2. Description of the Prior Art

Ziegler-type catalysts, which usually include components of a metal of Group IV–VIB and organometallic compounds of Groups I–IIIA of the Periodic Table of Elements, are widely utilized in the polymerization of olefins. These catalysts are known to effectively promote the high yield polymerization of olefins possessing commercially desirable characteristics. However, the use of conventional Ziegler-type catalysts are subject to important failings. Thus, new and improved catalysts are continually being sought and developed.

One such improvement comprises supporting the above-identified Ziegler-type catalyst components on refractory inorganic oxide supports, such as $SiO_2$, $Al_2O_3$ and MgO. These supports are available in variety of particle sizes and porosities. Ziegler-type catalysts supported on inorganic oxides oftentimes exhibit high catalytic activity and enhanced polymeric properties compared to Ziegler-Natta catalysts that are unsupported. An example of a catalyst which employs silica as a support material is described in U.S. Pat. No. 4,950,631 to Buehler et al. Increased activity of such silica supported catalysts can be achieved by adding one or more cocatalyst components or promoters to the solid catalyst component.

Despite their usefulness, inorganic oxide supports have certain drawbacks. For example, inorganic oxide supports must generally be calcined at high temperatures or chemically treated with appropriate reagents to remove physically adsorbed water from the surface of the support. The presence of water on the surface of inorganic oxide supports is well known in the art as being a catalytic poison which can adversely affect the catalytic activity of the catalyst.

In addition, inorganic oxide supports have a limited maximum pore size which also can restrict the catalytic performance of the catalyst. Although large pore size inorganic oxides are available, these materials may be friable and the use thereof as catalyst supports may, through attrition, lead to the formation of unwanted fine particles.

Furthermore, it is well known in the art that inorganic oxides adsorb not only water, but other commonly occurring catalyst poisons, such as oxygen, as well. Thus, great care in handling and preparing inorganic oxide supported catalysts must always be exercised.

To circumvent the above drawbacks commonly observed in inorganic oxide supported catalysts, many research groups have focused on substituting polymeric supports for inorganic oxide supports. See, for example, U.S. Pat. Nos. 4,098,979; 4,268,418; 4,404,343; 4,407,722; 4,568,730; 4,900,706; 5,051,484; 5,118,992; and 5,275,993.

Typical polymeric supports employed in the prior art are organic polymers such as polyethylene, polypropylene, polystyrene, polyvinyl alcohol, poly(styrene-divinylbenzene), poly(methylmethacrylate) and the like.

The use of these polymeric supports provides several advantages over similar olefin polymerization catalyst components supported upon inorganic oxides. For example, polymeric supports usually require no dehydration prior to use; they can also be easily functionalized which afford more opportunities to prepare tailor-made catalysts; they are inert; they can be prepared with a wide range of physical properties, via chemical and mechanical means to intentionally give porosity, morphology and size control to the catalyst; and they offer a cost advantage over inorganic oxide supports.

Despite these advantages, prior art polymeric supports nevertheless possess certain inherent disadvantages which decrease their acceptability as viable replacements for inorganic supports. For instance, polymeric supports often lack structural stability at high temperatures and under some solvent conditions. Moreover, the porosity and size of the polymeric support, due to swelling may change drastically over the short time duration required to prepare the catalyst. Furthermore, the choice of the polymer support must be compatible with the polymer produced in order to avoid the formation of gels.

It would thus be highly advantageous to provide a polymeric support which overcomes the above drawbacks while still being useful in the polymerization of α-olefins.

SUMMARY OF THE INVENTION

The present invention is directed to a process of producing a novel Ziegler-Natta catalyst that is useful for the homopolymerization or copolymerization of α-olefins. More specifically, the supported catalyst of the present invention is obtained by the steps of:

(a) providing a particulate functionalized olefin copolymer support comprised of discrete particles that are spherical or substantially spherical having a median particle size ranging from about 1 up to about 500 microns, a pore volume less than 0.1 cc/g and a surface area of less than 15 $m^2$/g, a melt index of about 1 up to about 125 g/10 min. and containing from about 50.1 to about 99.9 weight percent $C_{2-3}$ α-olefin and from about 0.1 to about 49.9 weight percent of a monomer selected from the group consisting of a vinyl ester and an acrylate;

(b) contacting said particulate olefin copolymer support with an organometallic compound, complex or mixture thereof under conditions effective to form a catalyst precursor;

(c) washing the catalyst precursor with an organic solvent; and (d) contacting said washed catalyst precursor produced in step (c) with at least one transition metal, transition metal compound or mixture thereof under conditions effective to produce a supported catalyst.

In another aspect of the present invention, the washed catalyst precursor of step (c) is contacted with an alcohol prior to step (d). In yet another aspect of the present invention, washing step (c) is omitted, but the catalyst precursor is then modified by contacting it with an alcohol. In a further aspect of the present invention, the particulate functionalized olefin copolymer support is contacted with both an alkyl magnesium compound or complex and an alkyl aluminum halide. In accordance with this embodiment of the present invention, it is preferred that the particulate copolymer support be first contacted with the alkyl aluminum halide and then with the alkyl magnesium compound or complex.

The present invention also relates to a process of homopolymerizing or copolymerizing α-olefins. In accordance with this aspect of the present invention, at least one α-olefin is polymerized using the supported catalyst of the present invention and a suitable cocatalyst under α-olefin polymerization conditions.

DETAILED DESCRIPTION OF THE PRESENT INVENTION

The particulate functionalized support of the instant invention is a copolymer of an α-olefin and a vinyl ester or an acrylate. The term "acrylate" being used in the generic sense to encompass esters of both acrylic and methacrylic acid.

The copolymer from which the particulate functionalized support of the present invention is obtained is produced by copolymerizing an α-olefin, especially ethylene and/or propylene, with one or more monomers selected from the group consisting of vinyl esters, lower alkyl acrylates, arylacrylates and methacrylate monomers.

Copolymerizations of α-olefins and the above monomers are well known and are generally carried out at pressures of up to about 30,000 psi and temperatures of from about 150° C. to about 250° C. in the presence of suitable catalysts. A typical process for copolymerizing ethylene and lower alkyl acrylates is described in U.S. Pat. No. 2,200,429 while a typical process for copolymerizing ethylene and vinyl acetate is described in British Patent Specification 1443394.

The above-mentioned copolymer has an α-olefin as the major constituent. More preferably, the copolymer of the invention has from about 50.1 to about 99.9 weight percent $C_{2-3}$ α-olefin copolymerized with from about 0.1 to about 49.9 weight percent of the monomer. Preferably, the copolymer will contain from about 70 to about 99 weight percent ethylene, propylene or mixtures thereof and from about 1 to about 30 weight percent of one of the above-identified monomers. In one highly useful embodiment, the copolymer support comprises from about 80 to about 97 weight percent ethylene and about 3 to about 20 weight percent acrylate or vinyl ester monomer.

The vinyl ester employed in the present invention may be a vinyl ester of a $C_2$–$C_6$ aliphatic carboxylic acid, such as vinyl acetate, vinyl propionate, vinyl butyrate, vinyl pentanoate or vinyl hexanoate. Of these vinyl esters, vinyl acetate is particularly preferred.

The acrylate monomer utilized in the present invention has the formula

where R is hydrogen or methyl and $R^1$ is an alkyl group having from about 1 to about 12 carbon atoms or an aryl group having from about 6 to about 12 carbon atoms. Alkyl groups may be straight chain or branched and can be saturated or unsaturated. Aryl groups can be unsubstituted, e.g., phenyl, or can contain one or more hydrocarbyl substituents, e.g., benzyl, tolyl, xylyl.

Representative acrylate comonomers which can be used for the copolymer include: methyl acrylate, ethyl acrylate, isopropyl acrylate, allyl acrylate, n-butyl acrylate, t-butyl acrylate, neopentyl acrylate, n-hexyl acrylate, cyclohexyl acrylate, benzyl acrylate, phenyl acrylate, tolyl acrylate, xylyl acrylate, 2-ethylhexyl acrylate, 2-phenylethyl acrylate, n-decyl acrylate, isobornyl acrylate, n-octadecyl acrylate, methyl methacrylate, ethyl methacrylate, propyl methacrylate, n-butyl methacrylate, sec-butyl methacrylate, n-pentyl methacrylate, n-hexyl methacrylate, n-octyl methacrylate, isooctyl methacrylate, isodecyl methacrylate, lauryl methacrylate and the like.

Among the preferred acrylate comonomers, alkyl acrylate comonomers having the above structural formula where R is hydrogen and $R^1$ is a $C_{1-4}$ alkyl group are particularly useful. Of these, methyl acrylate, ethyl acrylate and n-butyl acrylate are especially preferred.

In a highly useful embodiment of the invention, the particulate support is ethylene-methyl acrylate, ethylene-ethyl acrylate, ethylene-vinyl acetate and ethylene-n-butyl acrylate copolymers.

The melt index of the microfine powder comprised of particles which are spheroidal or substantially spheroidal is in the range of from about 1 up to about 125, and more preferably, from about 1 up to about 60. All melt indexes referred to herein are determined at 190° C. in accordance with ASTM D 1238, condition E, and are expressed in grams per 10 minutes.

In accordance with a preferred practice of the present invention, the support is a "microfine" powder of a particulate functionalized copolymer obtained by dispersion processes. Particles produced by these processes are spheroidal or substantially spheroidal in shape. Microfine powders produced using dispersion processes, in addition to having spheroidal shape also have substantially narrower particle size distributions than reactor powders or powders produced by precipitation, grinding or milling.

The preferred microfine functionalized polymer support is comprised of discrete particles which are spheroidal or substantially spheroidal in shape and have a median particle size (diameter) from about 1 microns to about 500 microns. More preferably, the median particle size is from about 5 microns to about 300 microns and in an especially useful embodiment, the median particle size is from about 20 to about 200 microns. Median diameters as used herein are obtained from the particle volume distribution curve.

The copolymer of the present invention is converted to microfine powder using the dispersion technique of U.S. Pat. Nos. 3,422,049, 3,432,483 and 3,746,681, details of which are incorporated herein by reference. In the powder-forming operation, the copolymer is charged to the reactor with a polar liquid medium and nonionic surfactant and a dispersion is formed in accordance with conventional dispersing procedures described in the art. The dispersing apparatus may be any device capable of delivering sufficient shearing action to the mixture at elevated temperature and pressure. Conventional propeller stirrers designed to impart high shear can be used for this purpose. The vessel may also be equipped with baffles to assist in dispersing the copolymer. Particle size and particle size distribution will vary depending on the shearing action which, in turn, is related to the stirrer design and rate of stirring. Agitation rates can vary over wide limits but the speed of the stirrer will usually be controlled so that the tip speed is between about 400 and about 4000 ft/min and, more commonly, about 800 and about 3500 ft/min. Higher tip speeds are generally used for batch operation, usually about 2500–3500 ft/min. Tip speeds for continuous procedures most generally range between about 800 and about 3000 ft/min.

The dispersion process is typically carried out in a vessel which enables the powder-forming process to be conducted at elevated temperature and pressure. In the usual batch process, all of the ingredients are charged to the vessel and the mixture is heated to a temperature above the melt point of the copolymer. While the temperature will vary depending on the specific polymer being used, it will typically range from about 175° C. to about 250° C. Since the fluidity of the polymer is temperature related, it may be desirable to carry out the process at temperatures substantially above the melt point of the copolymer to facilitate formation of the dispersion; however, the temperature should not exceed the thermal degradation temperature of the polymer.

Stirring is commenced after the desired temperature is reached and continued until a dispersion of the desired droplet size is produced. That is, stirring is continued until the molten copolymer is sufficiently dispersed so as to yield particles having a median particle size ranging from about 1 up to about 500 microns. This will vary depending on the particular copolymer being used, temperature, amount and type of surfactant, and other process variables, but generally will range from about 5 minutes to about 2 hours. Stirring is most commonly maintained for a period of from about 10 to about 30 minutes.

A polar liquid medium which is not a solvent for the copolymer is employed as the dispersant in the formation of the microfine powder support. These polar media are hydroxylic compounds and can include water, alcohols, polyols and mixtures thereof. The weight ratio of polar liquid medium to polymer ranges from about 0.8:1 to about 9:1 and, more preferably, from about 1:1 to about 5:1. It is particularly advantageous to use water as the dispersing medium or a liquid medium where water is the major component.

The pressure of the process is not critical so long as a liquid phase is maintained. In general, the pressure can range from about 1 up to about 250 atmospheres. The process can be conducted at autogenous pressure or the pressure can be adjusted to exceed the vapor pressure of the liquid medium at the operating temperature. Most generally, with aqueous dispersions, the pressure will range from about 5 to about 120 atmospheres.

To form acceptable dispersions, one or more dispersing agents are necessarily employed. Useful dispersing agents are nonionic surfactants which are block copolymers of ethylene oxide and propylene oxide. Preferably, these nonionic surfactants are water-soluble block copolymers of ethylene oxide and propylene oxide and have molecular weights greater than about 3500. Most will contain a major portion by weight of ethylene oxide and are obtained by polymerizing ethylene oxide onto preformed polyoxypropylene segments. The amount of nonionic surfactant employed can range from about 4 to about 50 percent, based on the weight of the copolymer. Most preferably, the nonionic surfactant is present in a concentration of from about 7 to about 45 percent, based on the weight of the copolymer.

Useful nonionic surface active agents of the above type are manufactured and sold by BASF Corporation, Chemicals Division under the trademark Pluronic. These products are obtained by polymerizing ethylene oxide onto the ends of a preformed polyoxypropylic base. Both the molecular weight of the polyoxypropylene base and the polyoxyethylene segments can be varied to yield a wide variety of products. One such compound found to be suitable in the practice of the process of this invention is the product designated as F-98 wherein a polyoxypropylene of average molecular weight of 2,700 is polymerized with ethylene oxide to give a product of molecular weight averaging about 13,500. This product contains 20 weight percent propylene oxide and 80 weight percent ethylene oxide. Other effective Pluronic® surfactants include F-88 (M.W. 11,250, 20% propylene oxide, 80% ethylene oxide), F-108 (M.W. 16,250, 20% propylene oxide, 80% ethylene oxide), and P-85 (M.W. 4,500, 50% propylene oxide, 50% ethylene oxide). These compounds, all containing at least about 50 weight percent ethylene oxide and having molecular weights of at least 4,500, are highly effective as dispersing agents for the aforementioned copolymers.

It is also possible to employ products sold under the trademark Tetronic which are prepared by building propylene oxide block copolymer chains onto an ethylenediamine nucleus and then polymerizing with ethylene oxide. Tetronic® 707 and Tetronic® 908 are most effective for the present purposes. Tetronic® 707 has a 30 weight percent polyoxypropylene portion of 2,700 molecular weight polymerized with a 70 weight percent oxyethylene portion to give an overall molecular weight of 12,000. Tetronic® 908, on the other hand, has a 20 weight percent polyoxypropylene portion of 2,900 molecular weight polymerized with an 80 weight percent oxyethylene portion to give an overall molecular weight of 27,000. In general, useful Tetronic® surfactants have molecular weights above 10,000 and contain a major portion by weight of ethylene oxide.

The powder-forming process may also be conducted in a continuous manner. If continuous operation is employed, the ingredients are continuously introduced to the system while removing the dispersion from another part of the system. The ingredients may be separately charged or may be combined for introduction to the autoclave.

The particulate copolymer support and especially the microfine spheroidal powder described above can be used to prepare any Ziegler-Natta catalyst. The supported catalyst of the present invention preferably comprises the particulate functionalized copolymer support; an organometallic compound, complex or mixture thereof; and a transition metal, transition metal compound or mixture thereof. One or more additional components such as electron donors or halogenating agents may also be present. The term "organometallic" as used herein denotes a compound or complex which contains at least one metal to carbon or metal to oxygen bond.

Preferred electron donors employed in the present invention are alcohols having the formula $R^5OH$ wherein $R^5$ is a straight or branched alkyl having from about 1 to about 6 carbon atoms. Examples of suitable alcohols include, but are not limited to: methanol, ethanol, n-propanol, i-propanol, n-butanol, i-butanol, n-pentanol and the like. A highly preferred alcohol employed herein is n-butanol.

Organometallic compounds suitable for use in the present invention include, for example, compounds of formulae I, II and III which are as follows:

$$R^2_a M^I (OR^3)_{1-a} \quad (I)$$

wherein $M^I$ is a metal of Group IA of the Periodic Table of Elements; $R^2$ and $R^3$ are the same or different and are hydrocarbyl groups, preferably containing from about 1 to about 20 carbon atoms and preferably selected from the group consisting of alkyl groups containing from about 1 to about 20, more preferably from about 1 to about 12, carbon atoms; alkenyl groups containing from about 2 to about 20, preferably from about 2 to about 12, carbon atoms; cycloalkyl or aryl groups containing from about 6 to about 20, preferably from about 6 to about 14, carbon atoms; or alkaryl or aralkyl groups containing from about 7 to about 20, preferably from about 7 to about 16, carbon atoms; and a is zero or 1;

$$R^2_b M^{II} (OR^3)_c X_{2-(b+c)} \quad (II)$$

wherein $M^{II}$ is a metal of Group IIA or IIB of the Periodic Table of Elements; b and c are each zero, 1 or 2, subject to the provisos that at least one of b and c is other than zero and the sum of b and c is not more than 2; X is halogen, preferably fluorine, chlorine, bromine or iodine; $R^2$ and $R^3$ are as defined above in formula I, subject to the provisos that when b is 2, each $R^2$ can be the same or different, or when c is 2, each $R^3$ can be the same or different; and $$R^2_d M^{III} (OR^3)_e Y_{3-(d+e)} \quad (III)$$

wherein $M^{III}$ is a metal of Group IIIA of the Periodic Table of Elements; d and e are each zero, 1, 2 or 3, subject to the provisos that at least one of d and e is other than zero and the sum of d and e is not more than 3; Y is hydrogen or halogen; and $R^2$ and $R^3$ are as defined in formula I, subject to the provisos that when d is 2 or 3, each $R^2$ can be the same or different, or when e is 2 or 3, each $R^3$ can be the same or different.

Organometallic compounds encompassed by formula I above include, for example:
 alkali metal alkyls, such as lithium alkyls (e.g., methyl lithium, ethyl lithium, butyl lithium, and hexyl lithium);
 alkali metal cycloalkyls, such as lithium cycloalkyls (e.g., cyclohexyl lithium);
 alkali metal alkenyls, such as lithium and sodium alkenyls (e.g., allyl lithium and allyl sodium);
 alkali metal aryls, such as lithium aryls (e.g., phenyl lithium);
 alkali metal aralkyls, such as lithium and sodium aralkyls (e.g., benzyl lithium, benzyl sodium and diphenylmethyl lithium);
 alkali metal alkoxides, such as lithium and sodium alkoxides (e.g., lithium methoxide, sodium methoxide and sodium ethoxide);
 alkali metal aryloxides, such as sodium aryloxides (e.g., sodium phenolate); and the like.

Organometallic compounds within the scope of formula II above include, for example:
 Grignard reagents (e.g., methyl magnesium chloride, methyl magnesium bromide, methyl magnesium iodide, ethyl magnesium chloride, ethyl magnesium bromide, cyclohexyl magnesium chloride, allyl magnesium chloride, phenyl magnesium chloride, phenyl magnesium bromide and benzyl magnesium chloride);
 metal alkyls, such as dialkyl magnesium compounds (e.g., dimethyl magnesium, butyl ethyl magnesium and dibutyl magnesium) and dialkyl zinc compounds (e.g., diethyl zinc);
 metal alkoxides, such as magnesium alkoxides (e.g., magnesium methoxide and di-2-ethyl-1-hexyloxymagnesium);
 Hydrocarbyloxy metal halides, such as alkoxymagnesium halides (e.g., pentyloxymagnesium chloride, 2-methyl-1-pentyloxymagnesium chloride and 2-ethyl-1-hexyloxymagnesium chloride), and the like.

Organometallic compounds within the ambit of formula III above, where e is other than zero, include aluminum-n-butoxide, aluminum ethoxide, aluminum ethylhexoate, diethylaluminum ethoxide, diisobutylaluminum ethoxide, diisobutylaluminum 2,6-di-tert-butyl-4-methyl phenoxide, and the like; and where e is zero compounds of formula III-a below can be employed in the instant invention:

$$R^2_f M^{III} Y_{3-f} \quad (III-a)$$

wherein $R^2$ is as defined in formula I, $M^{III}$ and Y are as defined in formula III and f is 1, 2 or 3, subject to the proviso that when f is 1, Y is X, as defined in formula II.

Organometallic compounds within formula III-a above include for example:
 trimethylaluminum (TMAL), triethylaluminum (TEAL), triisobutylaluminum (TIBAL), tridodecylaluminum, trieicosylaluminum, tricyclohexylaluminum, triphenylaluminum, triisopropenylaluminum, tribenzylaluminum, diethylaluminum hydride (DEAH), diisobutylaluminum hydride (DIBAH), dimethylaluminum bromide, diethylaluminum chloride (DEAC), diisobutylaluminum bromide, didodecylaluminum chloride, dieicosylaluminum bromide, isopropylaluminum dibromide, ethylaluminum dichloride (EADC), and the like.

Other organometallic compounds outside the scope of generic formulae I–III are also contemplated for use in the present invention. The organometallic compounds outside the scope of generic formula I–III include, but are not limited to, ethylaluminum sesquichloride (EASC), $(C_2H_5)_3Al_2Cl_3$; linear or cyclic aluminoxanes and dimeric compounds of the formula $(R')_2$—Al—O—Al—$(R')_2$ wherein each R' is the same or different and is an alkyl containing from about 1 to about 6, preferably from about 2 to about 4, carbon atoms.

Complexes of the forgoing organometallic compounds are also contemplated by the instant invention. For example, an organometallic compound of magnesium may be complexed with an organoaluminum halide to form a Mg—Al complex. The magnesium-aluminum complexes which may be used in the present invention are well known in the art and are disclosed in Aishima et al., U.S. Pat. No. 4,004,071 at column 3, lines 34–40 and column 3, lines 30–36, the contents of which are incorporated herein by reference. The complex is prepared according to the teachings of Ziegler et al., Organometallic Compounds XXII: Organomagnesium-Aluminum Complex Compounds, Annalen der Chemie, 605, pp. 93–97 (1957).

Mixtures of suitable organometallic compounds can be used in the present invention. A highly preferred organometallic compound that may be employed in the present invention comprises a combination of an alkyl magnesium-containing compound or complex, e.g. a magnesium-aluminum complex, and an alkyl aluminum halide such as ethyl aluminum dichloride and diethyl aluminum chloride.

When the foregoing combination of organometallic compounds is employed, it is preferred that the particulate olefin copolymer support be first contacted with an alkyl aluminum halide and then with an alkyl magnesium compound or complex.

In a first preferred embodiment of the present invention, the organometallic compounds are the alkyls, alkoxides or aryls of magnesium or its complexes thereof. In a second preferred embodiment, an alkyl, alkoxide or aryl of magnesium (or its complexes) is utilized in conjunction with an alkyl, alkoxide or aryl of aluminum (or its complexes). Of these preferred organomagnesium and organoaluminum compounds, magnesium dialkyls and aluminum trialkyls, wherein the alkyl moieties contain from about 1 to about 8 carbon atoms, are particularly preferred.

Known transition metals or transition metal compounds employed in the preparation of Ziegler-Natta catalysts can be used for the catalysts of the invention. Suitable transition metal compounds are compounds of metals of Group IVB, VB, VIB or VIIB of the Periodic Table of the Elements. Illustrative transition metal compounds are compounds of titanium, vanadium, molybdenum, zirconium or chromium, such as $TiCl_3$, $TiCl_4$, alkoxy titanium halides, $VCl_3$, $VCl_4$, $VOCl_3$, alkoxy vanadium halides, $MoCl_5$, $ZrCl_4$, $HfCl_4$ and chromium acetylacetonate. Mixtures of transition metal compounds to provide dual site bimetallic catalysts, such as titanium and vanadium-containing catalysts, can also be employed. Compounds of titanium and/or vanadium are especially useful for the catalysts of the invention.

The Ziegler-Natta catalyst of this invention is generally employed with a cocatalyst, sometimes also referred to as a catalyst promoter or catalyst activator. The cocatalyst employed in the present invention contains at least one metal selected from Groups IB, IIA, IIB, IIIB, and IVB of the Periodic Table of Elements. Such cocatalysts are known and widely used in the polymerization art and can include metal alkyls, hydrides, alkylhydrides, and alkylhalides, such as alkyllithium compounds, dialkylzinc compounds, trialkylboron compounds, trialkylaluminum compounds, alkylaluminum halides, alkylaluminum hydrides, and the like. Mixtures of cocatalytic agents can also be employed. Illustrative organometallic compounds which can be used as cocatalyst include n-butyllithium, diethylzinc, di-n-propylzinc, triethylboron, trimethylaluminum, triethylaluminum, triisobutylaluminum, tri-n-hexylaluminum, ethylaluminum dichloride, ethylaluminum dibromide, ethylaluminum dihydride, diethylaluminum chloride, di-n-propylaluminum chloride, and the like. Preferred cocatalysts are Group IIIB metal alkyls and alkyl metal halides, especially wherein the metal is aluminum and the alkyl group contains from about 1 to about 8 carbon atoms. Triethylaluminum and triisobutylaluminum are highly useful cocatalysts for the supported Ziegler-Natta catalysts of the invention and are particularly preferred.

Cocatalysts are employed in amounts effective to promote (increase) the polymerization activity of the supported Ziegler-Natta catalyst. The amount of cocatalyst used can vary widely but most generally the molar ratio of the metal of the cocatalyst to the transition metal ranges from about 1:1 to about 500:1 and, more preferably, from about 5:1 to about 200:1. In the embodiment of the invention where aluminum alkyls or aluminum alkyl halides are employed as the cocatalyst with a titanium compound and magnesium compound, the Al/Ti molar ratio generally ranges from about 5:1 to about 100:1. The catalyst may be activated in-situ by adding the cocatalyst and supported catalyst separately to the polymerization or the supported catalyst and activator may be pre-contacted before introduction to the polymerization reactor.

Cocatalysts for polymerization may be employed singly in the manner described, or in concert with other such modifiers, activators or promoters to enhance activity or influence resin properties. The use of cocatalyst modifiers is described, e.g. in U.S. Pat. No. 5,334,567 to Menon et al. regarding halosilanes; and U.S. Pat. No. 5,275,991 to Buehler et al. regarding alkoxysilanes.

Preferred compounds which may be employed as cocatalyst modifiers include halocarbons such as carbon tetrachloride, carbon tetrabromide, dichloromethane, dibromomethane, 1,1,1-trichloroethane and a number of commonly available chlorofluorocarbons (CFC's) and hydro-chlorofluoracarbons (HCFC's); halosilanes such as silicon tetrachloride, trichlorosilane, dichlorosilane; and alkoxysilanes such as dimethoxysilane, diethoxysilane, diisopropoxysilane, trimethoxysilane and tetramethoxysilane, and more preferably the alkoxysilane is phenyltriethoxysilane and cyclohexyltrimethoxysilane.

Except for use of the particulate olefin copolymer support, the Ziegler-Natta catalyst of the invention is prepared utilizing conventional organometallic compounds and transition metal compounds, in accordance with standard catalyst-forming procedures. Typically, the copolymer support is contacted with the organometallic compound, complex or mixtures thereof in an aliphatic $C_{5-8}$ hydrocarbon. When this contact is complete, the product is contacted with the transition metal compound. The organometallic compound and the transition metal compound are generally dissolved in an aliphatic hydrocarbon for introduction. A slight exotherm may be observed upon contacting the organometallic compound with the support material. The support may be allowed to remain in contact with the organometallic compound for periods of up to 20 hours or more but reaction is sufficiently complete within about 30 minutes. All or a portion of the aliphatic hydrocarbon may be removed after contacting with the organometallic compound and the intermediate catalyst product may be washed, if desired. While it is not necessary, it is possible to wash and/or dry the catalyst precursor before contacting with the transition metal compound. In general, it has been observed that resins with higher bulk densities are produced using catalysts which have been prepared without washing between the contacting steps. When washing is employed, an aliphatic hydrocarbon solvent such as heptane is employed. Washing may be conducted as many times as desired, but typically washing is repeated up to 3 times. If desired, the catalyst precursor, washed or unwashed, may be contacted with one of the above mentioned alcohols prior to contacting with the transition metal compound. The amount of alcohol added may vary depending upon the 5 catalyst but it typically is added in an amount of from about 0.05 to about 2.0 mmol per gram of support. More preferably, from about 0.1 to about 1.0 mmol of alcohol per gram of support is employed.

If all or part of the aliphatic hydrocarbon is removed from the catalyst precursor, it will be redispersed in fresh, aliphatic hydrocarbon prior to contacting with the transition metal compound. A change in color of the catalyst, e.g., from pale yellow to brown when $TiCl_4$ is used, is usually observed upon contacting with the transition metal compound; however, the hydrocarbon medium will typically remain colorless. Reaction with the transition metal compound will generally be complete in 30 minutes or less; however, extended contact times do not appear to adversely affect the catalyst. While it is not necessary, the supported catalyst may be washed and dried after recovery. After the transition metal is reacted, the supported catalyst is recovered for use in polymerizations.

The supported catalyst obtained in this manner is a fine, free-flowing powder having particles not differing substantially in size, shape and particle size distribution from that of the copolymer support material used for preparation. The supported catalyst can contain from about 0.25 up to about 25 weight percent transition metal. More typically, transition metal contents will range from about 0.5 to about 10 percent. In a preferred embodiment of the invention where the organometallic component is a magnesium compound, magnesium contents will range from about 0.1 to about 25 and, more preferably, about 0.25 to about 10 weight percent and magnesium/transition metal molar ratios will range from about 4:1 to about 0.25:1 and, more preferably, from about 2.5:1 to about 0.4:1.

In one highly useful embodiment of the invention, the magnesium compound has the structural formula $R_2Mg$ wherein R is an alkyl group containing from about 1 to about 8 carbon atoms and the transition metal compound has one of the following structural formulas:

$Ti(OR^4)_xX_y;$ or

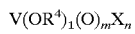

$V(OR^4)_1(O)_mX_n$ wherein $R^4$ is an aliphatic or aromatic hydrocarbyl group containing from about 1 to about 12 carbon atoms; X is Cl, Br, or I; x is 0, 1 or 2, y is 1 to 4 inclusive; x+y=3 or 4; l is 0 or 1–5; m is 0 or 1; and n=(5–l–2m) or 4 or 3 when l=0, m=0.

Suitable titanium compounds encompassed by the above formula are $TiCl_3$, $TiCl_4$, $Ti(OCH_3)Cl_3$, $Ti(OC_6H_5)Cl_3$, $Ti(OC_2H_5)_2Cl_2$, $Ti(OC_2H_5)_3Cl$, $Ti(OC_4H_9)_2Cl_2$ and $Ti(OC_4H_9)_4$. $TiCl_4$ is especially useful in the preparation of the catalyst of this invention.

Suitable vanadium compounds encompassed by the above formula include vanadium oxyhalides, vanadium carboxylates and vanadium halides. $VCL_4$ and $VOCl_3$ are particularly preferred in the present invention.

The formation of the catalyst may also involve reaction with known electron donors including alcohols, phenols, ketones, aldehydes, carboxylic acids, carboxylic acid esters, ethers, and the like. Particularly useful electron donors include the alkyl esters of aliphatic carboxylic acids, aliphatic alcohols, aliphatic ketones and aliphatic ethers.

Ziegler-Natta catalysts typically contain halogen, primarily chlorine. The source of the halogen most commonly is provided by the magnesium or transition metal compound. Halogenated titanium and vanadium compounds are particularly useful halogen sources. Halogen can, however, be supplied by a halogenating agent such as hydrogen halides, organohalides, aluminum halides, silicon halides or phosphorus halides.

The catalyst of the invention can be used in virtually any polymerization procedure where supported Ziegler-Natta catalysts have heretofore been utilized. This includes both gas phase (stirred or fluidized bed) polymerizations and solution polymerizations. It is highly effective for stirred bed and fluidized bed polymerization processes which are carried out in the substantial absence of a liquid reaction medium. Such procedures are well known and described in the prior art and may be conducted in a single reactor or in multiple reactors connected in series. The catalyst is equally effective for use in particle form (slurry) processes which are also described in the prior art. These polymerizations are carried out in a liquid organic medium in which the catalyst is suspended. A pressure sufficient to maintain the organic diluent and at least a portion of the monomer in the liquid phase is maintained.

The supported catalyst of the invention is useful for the preparation of homopolymers and copolymers of alpha-olefins containing from about 2 to about 8 carbon atoms. Most preferably, it is used to produce polymers comprised predominantly of ethylene and/or propylene with densities ranging from about 0.90 to about 0.97 and having a desirable balance of rheological and physical properties making such polymers useful in applications such as blow molding, injection molding, rotomolding, rotolining, extrusion, coextrusion, film forming and the like.

Moreover, the polymers produced herein have the same morphology as the supported catalyst used in the polymerization process. That is, the polymers produced by the instant process have substantially spherical particles and a median particle size which depends on both the median particle size of the catalyst particles and the amount of polymer produced per unit amount of catalyst employed in the polymerization. The median particle size can thus range from about 10 to about 5000 microns. Such polymer particles produced in the present invention possess a better bulk density and fluidization compared to prior art polymer particles prepared from conventional polymeric supported catalysts. Furthermore, the polymer particles produced in the present invention are compatible with the functionalized polymeric support.

It has been unexpectedly determined that washing the catalyst precursor prior to addition of an alcohol and/or a transition metal compound provides polymer particles that have a lower proportion of fines in the product as well as a low polymerization rate decay. An increase in MI and bulk density is observed when EMA having a small particle size (9 microns) or less is employed.

The alcohol modified catalyst of the present invention unexpectedly provide a low decay of rate of polymerization. Moreover, polymers produced from the alcohol modified catalyst have a high bulk density and narrow MWD.

In addition to the above, the combination of an alkyl magnesium compound or complex and an alkyl aluminum halide provides a catalyst that has high polymerization activity as well as polymers that have enhanced physical properties such as bulk density.

The following examples are given to illustrate the scope of the invention. As will be apparent to those skilled in the art, numerous variations are possible and thus the scope of this invention should not be limited thereto.

PREPARATION OF PARTICULATE SUPPORTS

An electrically heated two-liter Parr [trademark] pressure autoclave equipped with a thermowell and thermocouple connected to a digital display was used to prepare the microfine powder supports following the general procedure set forth in U.S. Pat. No. 3,422,049, the contents of which are incorporated herein by reference. The autoclave was equipped with an agitator and a Strahman [trademark] valve to permit rapid discharge of the hot polymer dispersion into a 5 gallon stainless steel discharge tank which was connected to the reactor via a 1" diameter stainless steel line. The hot dispersion was rapidly discharged into this tank containing approximately 6.5 liters of 20–23° C. water at the completion of each run. The hot dispersion was introduced below the surface of the water. The autoclave agitator used had three, six-bladed, impellers and was driven by a 2 HP DC variable speed motor.

The powder produced in this operation was analyzed using laser light scattering to measure the size distribution thereof by volume. This technique used the principle of diffraction of the particles as the measurement means. A Model 2600C Malvern Particle Size Analyzer with proper lens configuration for the expected particle size interfaced with a computer was used. It read the diffraction pattern and digitally performed the necessary integrations. For the powder analysis, water was charged to the water bath and circulated through the sample measuring chamber. After obtaining the baseline measurement, the agitator and sonic vibrator were activated and the copolymer powder was added to the water bath until the obscuration reading was 0.3. Mixing and circulation were controlled to obtain acceptable dispersion without excessive foaming. A drop of liquid detergent was added to facilitate dispersion. After eight minutes agitation, measurements were commenced and the size distribution data was automatically tabulated. The cumulative volume undersize and volume frequency was tabulated for 32 size classes together with useful derived parameters. A logarithmic plot was also produced. Duplicate runs were made for each copolymer powder sample. The particle size reported in the examples was the median diameter D(v,0.5) for the volume distribution curve. The range reported in the examples was for 80 percent of the volume distribution curve, i.e., from D(v,0.1) to D(v,0.9). In other words, ten percent of the powder particles were sized below the recited lower limit and 10 percent of the powder particles were larger than the upper recited particle size limit. This range provides a convenient means of comparing powders.

Following the procedure of Example I of U.S. Pat. No. 3,422,049, particulate microfine supports were produced from the following ethylene-acrylate and ethylene-vinyl acetate copolymers.

|  | Monomer (wt. %) | Density | Melt Index | Melting Point[1] | VICAT Softening Point[2] |
|---|---|---|---|---|---|
| EMA1 | methyl acrylate (16.5) | 0.939 | 6.0 | 86° C. | 57° C. |
| EMA2 | methyl acrylate (17.0) | 0.939 | 1.7 | 85° C. | 60° C. |
| EEA | ethyl acrylate (18.0) | 0.930 | 6.0 | 103.1° C. | N.D. |
| ENBA1 | n-Butyl acrylate (19.4) | 0.926 | 6.0 | 92.8° C. | 62° C. |
| ENBA2 | n-Butyl acrylate (5.0) | 0.922 | 2.9 | 107.3° C. | 86° C. |
| EVA | vinyl acetate (9.0) | 0.926 | 11.2 | 96° C. | 75° C. |

[1]Determined by Differential Scanning Calorimetry; ASTM D-3417 and D-3418
[2]ASTM D-155, condition B For each powder preparation, 450 grams of the copolymer was combined with 180 grams dispersing agent (Pluronic® F-98) and 810 grams water. The reactor was sealed, heated and when the temperature reached about 200° C. agitation was commenced. Temperature (° C.) and rate of agitation (rpm) for each run as well as the median particle diameter (microns) and particle size range (in microns for 80 percent of the volume distribution curve) for the microfine powder produced are provided in Table 1.

The powders thus prepared, designated as Copolymer Supports A–G, were employed in the preparation of the supported Ziegler-Natta catalysts in the examples which follow. All of the above-prepared copolymer supports were free-flowing powders comprised of discrete particles having spherical morphology, i.e., the individual particles are spherical or substantially spherical in shape.

Copolymer Support A was also more fully characterized and found to have a surface area of 2.1 m$^2$/g, a pore volume of 0.021 cc/g and average pore radius of 203 Å by the BET method. These measurements were carried out using an Autosorb-6 [trademark] instrument and the physical measurements were determined using the techniques described in S. Lowel et al., "Powder Surface Area and Porosity", 2nd Ed., Chapman and Hall, London, 1984. Furthermore, the copolymer support had a weight average molecular weight ($M_w$) of 110,400, number average molecular weight ($M_n$) of 24,700 and MWD ($M_w/M_n$) of 4.50.

Copolymer Supports A, B and D–G were utilized as obtained from the powder-forming process. A commercial microfine EVA powder (Copolymer Support H) was also included. Additionally, a particulate support was obtained by cryogenically grinding EMA1. Cryogenic grinding of this sample was conducted by mechanical means, using a Wiley mill which was equipped with a recirculating refrigerant. The polymer sample, i.e. EMA1, was ground along with dry ice so as to not incur polymer melting. The polymer was also ground so as to pass through a 20 mesh size screen. The resulting ground powder, identified as Copolymer Support I (not shown in Table 1) and having an average particle size of 590 microns and particle size distribution of 297 to 840 microns, was also employed in the preparation of Ziegler-Natta catalysts in the examples which follow.

TABLE 1

| Co-polymer Support | Co-polymer | Temperature (° C.) | Agitation (rpm) | Median Particle Size[1] (microns) | Particle Size Range[2] (microns) |
|---|---|---|---|---|---|
| A | EMA1 | 210 | 3200–3340 | 32.4 | 14.3–61.6 |
| B | EMA1 | 206–212 | 1610–1630 | 59.8 | 16.4–118.9 |
| C | EMA1 | 208–213 | 399–405 | 85.5 | 24.5–211.5 |
| D | EMA2 | 210–218 | 3200–3280 | 55.3 | 26.1–100.2 |
| E | EEA | 210–219 | 3200–3280 | 61.8 | 29.3–100.3 |
| F | ENBA1 | 210–222 | 3200–3290 | 61.5 | 35.5–79.0 |
| G | ENBA2 | 210–218 | 3200–3240 | 68.7 | 30.5–130.9 |
| H | EVA | — | — | 8.8 | 3.2–20.2 |

[1]D (v, 0.5)
[2]D (v, 0.1)–D (v, 0.9)

PREPARATION OF SUPPORTED CATALYSTS AND POLYMERIZATIONS

EXAMPLE I

To illustrate the preparation of a supported Ziegler-Natta catalyst, 5.38 grams of Copolymer Support A was slurried with 75 ml dry heptane under a nitrogen atmosphere in a 250 ml round-bottom flask equipped with a stirring bar. Fifteen (15) ml of 0.633M butyl ethyl magnesium, commercially available from AKZO Chemicals Inc., under the designation MAGALA [trademark] BEM, in heptane was added under nitrogen at room temperature whereupon the support quickly developed a faint yellow tint and a slight exotherm was observed. After stirring for 20 hours, the catalyst precursor was recovered by filtration, washed once with 100 ml heptane, and then re-slurried in 100 ml fresh heptane. Two (2) ml 1.0M TiCl$_4$ in heptane was then added with vigorous stirring and the pale yellow support immediately turned brown. After 30 minutes the supported polymer was recovered by filtration, washed two times with 75 ml heptane and then dried under vacuum. Analysis showed the catalyst to contain 1.44% Mg and 1.37% Ti. The molar ratio of Mg/Ti was 2.06.

This preparative example illustrates that a substantial portion of the organometallic compound interacts with the support particles. Washing the catalyst after both the addition of the organometallic compound as well as after the addition of the transition metal compound in a solvent suitable for the dissolution of both free reagents serves to remove virtually all materials which might otherwise be considered to interact independently of the support. Analysis of the final catalyst composition revealed that the catalyst retained 33% and 77% of the magnesium and titanium employed, respectively.

The supported catalyst was used to prepare ethylene homopolymer and copolymers of ethylene and butene-1. Four polymerizations, identified as a–d, were carried out in a one-liter stirred autoclave charged with 500 ml dried, deoxygenated isobutane. For the copolymerizations, an amount of isobutane was used to bring the total volume of comonomer and isobutane to 500 ml. Hydrogen was added to control molecular weight and triethylaluminum (TEAL) was used as the cocatalyst. Polymerizations were carried out at 80° C. and 500 psig. Ethylene gas was used to maintain this pressure. Upon completion of the polymerization, the reactor was vented and cooled to ambient temperature to recover the copolymer. Details of each polymerization and characteristics of the resins produced are provided in Table 2.

TABLE 2

|  | Ia | Ib | Ic | Id |
|---|---|---|---|---|
| Catalyst wt. (g) | 0.057 | 0.051 | 0.015 | 0.023 |
| $H_2$ (mmol) | 164 | 245 | 164 | 164 |
| Butene-1 (ml) | 0 | 0 | 25 | 200 |
| TEAL (mmol) | 0.32 | 0.32 | 0.32 | 0.64 |
| Temp. (° C.) | 80 | 80 | 80 | 80 |
| Time (min) | 30 | 55 | 60 | 60 |
| Activity (g/gcat hr) | 3,381 | 2,225 | 5,483 | 6,663 |
| $MI^1$ | 0.138 | 0.87 | 0.54 | 2.44 |
| $MIR^2$ | 42.9 | 39.1 | 29.9 | 29.8 |
| Density (g/cc)$^3$ | 0.9553 | N.D. | 0.9455 | 0.9249 |
| Bulk density (g/cc)$^4$ | 0.197 | 0.206 | 0.214 | 0.250 |
| $M_w^5$ | 215,454 | 138,100 | 168,278 | 111,217 |
| $M_n^5$ | 44,755 | 24,700 | 34,433 | 22,903 |
| $MWD^6$ | 4.8 | 5.6 | 4.9 | 4.9 |

[1]Determined by ASTM D-1238, Condition E, reported as g/10 minutes.
[2]MIR = HLMI/MI; HLMI was determined by ASTM D-1238, Condition F, reported as g/10 minutes.
[3]Determined by floatation in a density gradient column after annealing an extrudate sample for 30 minutes at 100° C. to approach equilibrium crystallinity.
[4]Measurements were performed on an unmodified reactor powder sample by pouring the sample through a 33 mm ID funnel into a 100 cc stainless steel cup without tapping or shaking, then leveling off the top with a straight edge and weighing by difference. Values reported as the mean of two measurements in g/cm$^3$.
[5]Weight and number average molecular weight determinations, i.e., $M_w$ and $M_n$, were made using a Waters GPC on a mixed sized, crosslinked divinylbenzene column with 1,2,4-trichlorobenzene as a solvent at 135° C. with a refractive index detector.
[6]The ratio of $M_w$ vs. $M_n$, i.e., MWD, was also determined by GPC.

EXAMPLES II–IV

To demonstrate the ability to vary the catalyst compositions, three supported catalysts were prepared using different copolymer supports and varying levels of magnesium and titanium. The same reagents and procedure as described in Example I were employed. The amount of each reagent employed in the preparation of the supported catalysts is set forth in Table 3. The supported catalysts were used to homopolymerize ethylene. The polymerization results and characteristics of the polyethylene resins produced are also provided in Table 3.

TABLE 3

|  | II | III | IV |
|---|---|---|---|
| Copolymer Support/grams | A/15.2 | B/5.3 | C$^1$/15.0 |
| BEM (ml) | 15.0 | 10.0 | 30.0 |
| $TiCl_4$ (ml) | 6.0 | 2.0 | 6.0 |
| % Mg | 1.17 | 0.83 | 0.90 |
| % Ti | 1.63 | 1.73 | 1.76 |
| Mg/Ti Molar ratio | 1.41 | 0.94 | 1.00 |
| Catalyst wt. (g) | 0.024 | 0.50 | 0.49 |
| TEAL (mmol) | 0.319 | 0.319 | 0.319 |
| $H_2$ (mmol) | 245 | 164 | 164 |
| Temp. (° C.) | 80 | 80 | 80 |
| Time/min | 60 | 30 | 30 |
| Activity (g/gcat hr) | 3,224 | 2,739 | 3,129 |
| MI | 0.735 | 0.143 | 0.053 |
| MIR | 37.1 | 36.6 | 62.5 |
| Density (g/cc) | 0.960 | 0.956 | N.D. |
| Bulk Density (g/cc) | 0.2041 | N.D. | 0.125 |
| $M_w$ | 143,666 | 235,936 | N.D. |
| $M_n$ | 26,727 | 41,542 | N.D. |
| MWD | 5.4 | 5.7 | N.D. |

[1]Sieved using a 200 mesh screen so that the average particle size was reduced to 68 microns.

EXAMPLE V

A supported catalyst was prepared utilizing Copolymer Support A. The reagents used were the same as used in Example I except that the catalyst precursor obtained after reaction of the support with BEM was not washed with additional heptane and the resulting supported catalyst, obtained after reaction with the $TiCl_4$, was not washed. After both reactions, the heptane was removed by stripping under vacuum. After removing the solvent from the catalyst precursor by evaporating under vacuum (with BEM), the catalyst precursor was re-slurried with 50 ml fresh heptane before addition of $TiCl_4$. After the second reaction (with $TiCl_4$), stripping was continued to dryness. For the catalyst preparation, 5 grams Copolymer Support A, 5 ml BEM and 2 ml $TiCl_4$ were used.

The resulting catalyst contained 1.34% Mg, 1.48% Ti and the Mg/Ti molar ratio was 1.77. The catalyst was used to polymerize ethylene and polymerization details are provided in Table 4.

EXAMPLE VI

Using the modified catalyst preparation procedure of Example V, a supported catalyst was prepared using 5 grams Copolymer Support A, 5 ml BEM and 4 ml $TiCl_4$.

The catalyst product contained 1.31% Mg, 2.80% Ti and the Mg/Ti molar ratio was 0.93. The catalyst was used to homopolymerize ethylene and polymerization details are provided in Table 4.

EXAMPLE VII

Following the procedure of Example I, cryogenically ground Copolymer Support I (5.68 grams) was reacted with 10 ml BEM and 2 ml $TiCl_4$. The resulting supported catalyst (0.29% Mg; 1.36% Ti, molar ratio Mg/Ti 0.42) was evaluated as a catalyst in the polymerization of ethylene. The results of this polymerization are reported in Table 4.

EXAMPLES VIII TO XIII

Modifying the general procedure of Example V, a series of supported catalysts were prepared using Copolymer Support A and the magnesium and titanium reagents of Example I. The amount of each of these components are identified below in the discussion of each of these catalysts. Any changes in the procedure of Example V and the analysis of each of the catalysts is also provided therein. The results obtained with each of the supported catalysts in the homopolymerization of ethylene or copolymerization of ethylene and butene-1 are reported in Table 4.

Supported Catalyst VIII:
   5.0 grams Copolymer Support A
   5.0 ml BEM
   2.0 ml $TiCl_4$ Prior to the contacting with $TiCl_4$, 5 ml 0.5M butanol in heptane was added and contacted at room temperature with agitation for 30 minutes. The supported catalyst contained 2.03% Ti and 1.20% Mg.

Supported Catalyst IX:
   5.0 grams Copolymer Support A
   5.0 ml BEM
   2.0 ml $TiCl_4$ Prior to contacting with $TiCl_4$, 1.25 ml 2.0M $SiCl_4$ in heptane was added and contacted at room temperature with agitation for 30 minutes. The supported catalyst contained 1.49% Ti, 1.29% Mg and 0.203% Si.

Supported Catalyst X:
   5.0 grams Copolymer Support A
   5.0 ml BEM
   2.0 ml $TiCl_4$ Contact with both the BEM and $TiCl_4$ was carried out at 40° C. for 30 minutes and 15 minutes, respectively. The supported catalyst was recovered by decanting the supernatant heptane after the catalyst settled and purging with nitrogen while heating the catalyst at 40° C. The supported catalyst contained 1.56% Ti and 1.48% Mg.

Supported Catalyst XI:
   5.0 grams Copolymer Support A
   3.0 ml MAGALA [trademark] 7.5E (7.5:1 ratio of di-n-butyl magnesium to TEAL in heptane)
   2.0 ml $TiCl_4$ For this preparation, the copolymer support was slurried in 75 ml pentane. After contacting the support with the MAGALA for 45 minutes at room temperature, the $TiCl_4$ was added directly to the slurry and agitation continued for 30 minutes. The supported catalyst was recovered by removing pentane using the a nitrogen purge. The supported catalyst contained 1.30% Ti, 1.07% Mg and 0.20% Al.

Supported Catalyst XII:
   5.0 grams Copolymer Support A
   6.0 ml (0.59M) 2-methylpentyloxymagnesium chloride in heptane
   4.0 ml $TiCl_4$ The copolymer support was slurried in 75 ml pentane and contacted with the 2-methylpentyloxymagnesium chloride at room temperature for one hour with agitation. The catalyst precursor was then stripped under vacuum to substantial dryness and washed with 75 ml fresh pentane and then re-slurried in 75 ml pentane prior to addition of the $TiCl_4$. The supported catalyst was recovered by purging with nitrogen at room temperature to remove pentane. The catalyst contained 2.71% Ti and 1.05% Mg.

Supported Catalyst XIII:
   15.0 grams Copolymer Support A
   15 ml BEM
   6 ml $TiCl_4$ The copolymer support was slurried in 150 ml pentane and contacted with BEM for one hour at room temperature with agitation and then with the $TiCl_4$ and additional stirring was conducted for 30 minutes at room temperature with agitation. The supported catalyst was recovered by purging with nitrogen at room temperature. The supported catalyst contained 1.31% Ti and 1.25% Mg.

EXAMPLE XIV

A supported vanadium catalyst was prepared utilizing the copolymer supports of the invention. To a slurry of 5.0 grams of Copolymer Support A in 80 ml heptane were added the following in the order indicated:

3.27 ml (1.07 M) MAGALA 7.5E;
   6.32 ml (0.554 M) TEAL in heptane;
   7.48 ml (0.535 M) $VCL_4$ in heptane; and
   2.0 ml (0.50 M) n-butanol in heptane.

The additions were made at room temperature at 30 minute intervals while vigorously agitating the slurry. When the additions were complete and after the final contact period, the catalyst was stripped under vacuum to remove solvent.

The dried supported catalyst contained 5.62% V, 1.07% Mg and 1.59% Al. Polymerization details obtained using the supported vanadium catalyst are reported in Table 4.

EXAMPLE XV

To demonstrate the ability to use other olefin-acrylate copolymers in the preparation of the supported catalysts of the invention, 5 grams Copolymer Support E was slurried with 75 ml pentane and contacted with 5 ml (0.633 M) BEM for 30 minutes at room temperature while stirring. Two (2.0) ml (1.0 M) $TiCl_4$ was then added and stirred for an additional 30 minute period.

The dried supported catalyst which contained 1.36% Ti and 1.19% Mg was evaluated for the polymerization of ethylene. Details of the polymerization and results are provided in Table 4.

EXAMPLE XVI

Using a procedure identical to that described in Example XV, except that the copolymer support used was Copolymer Support F, a supported catalyst was prepared containing 1.34% Ti and 1.23% Mg.

The supported catalyst was used to polymerize ethylene and polymerization details and results are provided in Table 4.

EXAMPLE XVII

Using a procedure identical to that described in Example XV, except that the copolymer support used was Copolymer Support D, a supported catalyst was prepared containing 1.28% Ti and 1.31% Mg.

Ethylene was polymerized using the supported catalyst and polymerization details and results are provided in Table 4.

EXAMPLE XVIII

Using a procedure identical to that described in Example XV, except that the copolymer support used was Copolymer Support G, a supported catalyst was prepared containing 1.23% Ti and 1.30% Mg.

The supported catalyst was used for the polymerization of ethylene and polymerization details and results are provided in Table 4.

EXAMPLE XIX

This example demonstrates the use of the copolymeric ethylene-vinyl acetate Support Material H of Table I.

The catalyst of this example was prepared by slurrying five (5.0) grams of the EVA material H with 100 ml dry heptane under a nitrogen atmosphere in a 250 ml roundbottom flask equipped with stirring bar. Five (5.0) ml of 0.633 M BEM was added and the resultant mixture was stirred for 30 minutes at room temperature under nitrogen. Thereafter, 0.2 ml of 1.0M $TiCl_4$ in heptane was added, changing the color of the copolymeric support to a dark brown. After a 30 minute interval, heptane was removed by purging with nitrogen gas and drying the resultant catalyst. The supported catalyst prepared using the above deposition process contained 1.29% Ti and 1.33% Mg.

This catalyst was then used to homopolymerize ethylene, the results and details of which are summarized in Table 4.

EXAMPLE XX

Another supported catalyst was prepared using the EVA support material used in Example XIX except that the catalyst was prepared using a filtration procedure. In accordance with this procedure, the slurry containing EVA, BEM and heptane was allowed to react overnight at room temperature under nitrogen. After this reaction, the slurry was filtered and washed once with 100 ml of dried heptane. The washed material was thereafter re-slurried in 100 ml of heptane and 2 ml of a solution of 1.0M $TiCl_4$ in heptane was added, changing the color of the resin to a light brown. This mixture was stirred for 30 minutes, filtered and then washed with 100 ml of heptane. The catalyst thus formed was vacuum dried to leave a flaxen-yellow powder containing 1.57% Ti and 0.47% Mg.

As with the catalyst of the proceeding example, the catalyst prepared above was used to homopolymerize ethylene. The polymerization details and results are tabulated in Table 4.

EXAMPLE XXI

In this example, a supported vanadium catalyst was prepared utilizing the EVA material of Table I. To a slurry of 5.0 grams of the Copolymer Support H in 80 ml of heptane were added the following in the order indicated:

12.7 ml (0.551 M) MAGALA 7.5 E;

10 ml (0.5 M) n-butanol in heptane; and 1.0 ml (0.5 M) $VCl_4$ in heptane.

The additions were made at room temperature at 30 minute intervals while vigorously stirring the slurry. When the additions were complete and after the final contact period, the catalyst was dried under vacuum to remove the solvent. The dried support catalyst contained 2.03% V, 0.95% Mg and 0.22% Al. Polymerization details using this supported vanadium catalyst are reported in Table 4.

TABLE 4

| CATALYST | CATALYST WT. (g) | BUTENE-1 (ml) | TEAL (mmol) | $H_2$ (mmol) | TEMP. (° C.) | TIME/MIN | ACTIVITY (g/gcat hr) |
|---|---|---|---|---|---|---|---|
| EX V | 0.023 | 0 | 0.32 | 245 | 80 | 60 | 2,768 |
| EX VI | 0.021 | 0 | 0.32 | 245 | 80 | 60 | 4,504 |
| EX VII | 0.052 | 0 | 0.53 | 164 | 80 | 30 | 3,692 |
| EX VIII | 0.023 | 0 | 0.32 | 245 | 80 | 60 | 3,047 |
| EX IX | 0.018 | 0 | 0.32 | 245 | 80 | 60 | 3,138 |
| EX X | 0.019 | 0 | 0.32 | 164 | 80 | 60 | 3,013 |
| EX XI | 0.023 | 0 | 0.32 | 245 | 80 | 60 | 1,370 |
| EX XII | 0.020 | 0 | 0.64 | 164 | 80 | 60 | 1,530 |
| EX XIII | 0.019 | 0 | 0.32 | 245 | 80 | 60 | 3,463 |
| EX XIV* | 0.051 | 0 | 1.28 | 41 | 90 | 60 | 1,887 |
| EX XV | 0.022 | 0 | 0.32 | 245 | 80 | 60 | 3,133 |
| EX XVI | 0.023 | 0 | 0.32 | 245 | 80 | 60 | 2,309 |
| EX XVII | 0.024 | 0 | 0.32 | 245 | 80 | 60 | 1,642 |
| EX XVIII | 0.024 | 0 | 0.32 | 245 | 80 | 60 | 1,124 |
| EX XIX | 0.020 | 0 | 0.32 | 245 | 80 | 60 | 1,282 |
| EX XX | 0.016 | 0 | 0.32 | 245 | 80 | 60 | 2,263 |
| EX XXI | 0.016 | 0 | 0.64 | 41 | 90 | 60 | 6,351 |
| CEI | 0.058 | 0 | 0.32 | 164 | 80 | 60 | 86 |
| CEII | 0.049 | 0 | 0.32 | 164 | 80 | 60 | 2 |

*1.25 ml of 1.0 M dibromethane added along with cocatalyst to reactor

COMPARATIVE EXAMPLE I

A supported catalyst was prepared in accordance with Example I, except that 10.0 grams of a microfine, spheroidal high density polyethylene powder (HDPE) made by the same dispersion process as used for Copolymer Support A and having a median particle diameter of 40 microns was used as the support material. Twenty (20.0) ml of 0.633 M BEM was added to the slurried support under nitrogen at room temperature. No color change or exotherm was observed during this contacting step, which was allowed to proceed for 20 hours. After this time period, the heptane was filtered off. The Mg-treated polymer was then washed with 100 ml of heptane, filtered, and re-slurried once again in heptane. Four (4.0) ml of 1.0 M $TiCl_4$ in heptane was then added to the treated support with vigorous stirring and the support immediately upon contact changed to an off-white shade. After 30 minutes of rapid stirring, the heptane was filtered off. The recovered supported material was washed twice with heptane (75 ml in each wash), then dried in vacuo. Analysis showed that the catalyst contained 0.038% Ti and 0.042 Mg.

This supported catalyst was then used to homopolymerize ethylene, the results and details of which are shown in Table 4.

The results of this comparative example clearly indicate that supported catalysts of the instant invention are vastly superior in terms of reactivity compared to supported catalysts that are used conventionally in the prior art, as evidenced by the supported catalyst of this comparative example.

COMPARATIVE EXAMPLE II

The supported catalyst of this comparative example was prepared in accordance with the procedure of Example I, except that 5.1 grams of a commercially available, spheroidal poly (methyl-methacrylate) (PMMA, MPS=164 microns) supplied by Aldrich was used as the support material. Five (5.0) ml of 0.633 BEM was added to the slurried support under nitrogen at room temperature. No color change or exotherm was observed. The reaction was allowed to proceed for 20 hours, after which the heptane was filtered off. The treated polymer was washed once with 100 ml of heptane, filtered, then re-slurried again in heptane. Three (3.0) ml of 1.0 M $TiCl_4$ in heptane was added to the re-slurried heptane with vigorous stirring. No color change of either the support or heptane was observed. After 30 minutes of rapid stirring, the heptane was filtered off. The recovered supported material was washed twice with heptane (two 75 ml portions) and then dried in vacuo. The supported catalyst contained 0.013% Ti and 0.017% Mg.

This supported catalyst was then used to homopolymerize ethylene. The polymerization results and details are set forth in Table 4.

As in CEI, the supported catalyst of this comparative example was inactive in polymerizing ethylene compared to the catalysts of the present invention.

EXAMPLE XXII

In this example, the catalyst of Example II was utilized as the catalytic agent in the gas phase polymerization of ethylene. The polymerization was conducted in a 2.5 liter stirred gas phase reactor. The cocatalyst TEAL (3.0 ml) was added to the reactor containing a 200 gram bed of polyethylene; the reactor was pressurized with nitrogen to a pressure of 142 psig (0.334 M). Hydrogen (58 psi, 0.136 M) was then added, and ethylene was fed slowly into the reactor. The catalyst (0.6 grams) was injected into the reactor and ethylene was fed on demand into the reactor to maintain a total reactor pressure of 377 psig at a reactor temperature of 80° C. (ethylene partial pressure of 176 psi, or 0.416 M).

Polymerization was continued under these conditions until 300 grams of polymer was produced. The reactor was thereupon vented and 300 grams of powder were removed from the reactor, leaving a 200 gram bed. A minimum of 4 runs were made with the catalyst to ensure adequate turnover of the seed bed.

The results of this gas phase polymerization are summarized hereinbelow:

| | |
|---|---|
| PE Productivity rate PE/g · hr | 243 grams |
| MI | 0.7 |
| MIR | 38.6 |
| Density | 0.9586 g/cc |
| Bulk density | 0.358 g/cc |
| Mean Particle Size | 818 microns |

| (Malvern Light Scattering) | |
|---|---|
| $M_w$ | 152,908 |
| $M_n$ | 21,032 |
| MWD | 7.3 |

EXAMPLE XXIII

In this example, the effect of washing the particulate olefin copolymer support after contacting with a dialkylmagnesium compound was investigated. The firs t catalyst prepared in this example, Catalyst A, includes the aforementioned washing step, whereas the second catalyst, Catalyst B, does not i nclude the foregoing washing step.

Catalyst Preparation

Catalyst A of this example was prepared as follows: A microfine powder comprised of EMA (mean particle diameter=47 microns; 17.4 weight % methyl acrylate) was prepared in accordance with the present invention using the procedure described hereinabove. Five, 5.0, grams of the particulate olefin copolymer support was suspended in approximately 100 ml of dry, deoxygenated heptane while stirring at room temperature. To this suspension was added 5.0 ml of MAGALA BEM solution (0.63 M; butylethylmagnesium in heptane, a product of Akzo Nobel Chemicals). This mixture was stirred for about 1 hour at room temperature; after which the s tirring was stopped and the solids were allowed to settle. The supernatant liquid was removed by siphoning and the solids were washed with 100 ml of heptane and stirred for several minutes. This process of siphoning and washing was repeated twice more. Next, 2.5 ml of a 1 M solution of 1-butanol in heptane were added and allowed to react for about 1 hour with stirring at room temperature. After this period of time, 2.5 ml of a 1 M solution of $TiCl_4$ in heptane was added and allowed to react for 1 hour at room temperature while continuously being stirred. Next, the stirring was stopped, the solids were allowed to settle and the supernatant liquid was removed by siphoning. Catalyst A was then dried in vacuo.

Catalyst B was prepared using the procedure described for Catalyst A except that no washing step was performed after the addition of the MAGALA BEM solution.

Gas Phase Polymerization

Each of the above catalysts were employed in the gas phase polymerization of ethylene which was carried out in a 3.3 liter stainless steel reactor that was initially charged with a 300 gram bed of PE particles. The cocatalyst (2.5 ml of a 1.6 M solution of triethylaluminum (TEAL) in heptane) and catalyst (0.25 grams of Catalyst A or B) were then added to the reactor under a dry nitrogen atmosphere. The reactor was heated to 80° C. followed by addition of hydrogen (88 psig), nitrogen (112 psig) and ethylene (177 psig) to give a total pressure of 377 psig. The polymerizations were allowed to proceed for about 3 to about 4 hours with ethylene being fed on demand to maintain the reactor pressure at 377 psig.

The rate of polymerization was monitored using a mass flowmeter which measured the flow of ethylene required to maintain constant pressure during the polymerization. The rate measured can be expressed by the equation: Rate= $Rate_o exp(-k_d t)$ where $Rate_o$ is the initial rate of polymerization, $k_d$ is the rate decay coefficient and t is the time of polymerization. The results of the polymerization using Catalyst A and B are shown in the following table:

| Catalyst | Activity (g/PE/g Cat · hr) | MI | Bulk Density (g/cc) | Mean Particle Size (microns) | % Fines (<128 microns) | (0–40 min) rate decay constant ($K_d$) | (40–120 min) rate decay constant ($K_d$) |
|---|---|---|---|---|---|---|---|
| A | 150 | 4.0 | 0.342 | 612 | 1.1% | −0.011 | −0.003 |
| B | 280 | 3.3 | 0.365 | 694 | 2.9% | −0.022 | −0.005 |

The results in the above table show the effect of washing the EMA support after contacting with MAGALA BEM. Specifically, this washing step leads to improved particle morphology, i.e. lower proportion of fines in the product, and less polymerization rate decay, i.e. steady rate profile when EMA is employed as the support.

EXAMPLE XXIV

In this example, the effect of washing was studied on catalysts which do not include alcohol modification. Specifically, two catalysts were prepared in this example; the first, Catalyst C, was washed after treatment with MAGALA BEM; the second, Catalyst D, was not washed.

Catalyst Preparation:

Specifically, Catalyst C was prepared by suspending 5.0 grams of microfine EMA copolymer powder (mean particle diameter=32 microns, 16.5 weight % MA) in approximately 100 ml of dry, deoxygenated heptane while stirring. To the suspension was added 13.5 ml of MAGALA BEM solution (0.63 M; butylethylmagnesium in heptane, a product of Akzo Nobel Chemicals). The mixture was stirred for about 1 hour at room temperature; thereafter mixing was stopped and the mixture was filtered to obtain solids. The filtered solids were resuspended in 100 ml of heptane; stirred for several minutes; and then filtered as before. This washing process was repeated. To the washed solids was added 2.0 ml of a 1 M solution of $TiCl_4$ in heptane and this mixture was stirred at room temperature for about 1 hour. The catalyst was then recovered as described in Example XXIII.

Catalyst D was prepared in the same manner as Catalyst C except that no washing step was employed.

Slurry polymerization:

The polymerizations reaction were carried in a 1 liter stainless steel reactor which was charged with 500 ml of dried, deoxygenated isobutane diluent. Hydrogen (240 mmol), TEAL (0.38 mmol) and ethylene were then added and the reactor and its contents were heated to 80° C. Twenty milligrams (20 mg) of catalyst A or B were injected into the reactor and the polymerization was initiated; ethylene was fed to the reactor on demand to keep a constant pressure of 500 psig. After 1 hour, unreacted isobutane and ethylene were vented, the vessel cooled to room temperature and the PE granules were recovered.

The results of the polymerization using Catalyst C and D are shown in the following table:

| Catalyst | Activity (g PE/g cat. hr) | MI | MIR | Bulk Density | Rate Decay Constant ($K_d$) |
|---|---|---|---|---|---|
| C | 2039 | 0.87 | 39.1 | 0.206 | +0.011 |
| D | 3460 | 0.48 | 36.1 | 0.28 | −0.032 |

As in the proceeding example, the catalyst that was washed exhibited less polymerization rate decay than the unwashed catalyst.

EXAMPLE XXV

In this example, the effect of washing a catalyst containing EVA as the support was investigated. Two catalysts were prepared in this example. Catalyst E was a washed catalyst whereas Catalyst F was an unwashed catalyst.

Catalyst Preparation

Five grams of EVA copolymer powder prepared in accordance with the present invention (mean particle diameter=47 micron, 9 weight % vinyl acetate) was suspended in approximately 100 ml of dry, deoxygenated heptane with continuous stirring. To this suspension was added 7.5 ml of MAGALA 7.5E (di-n-butylmagnesium triethylaluminum complex, nominal Mg/Al 6-9; 0.42 M dibutylmagnesium in heptane; Akzo Nobel Chemical). The mixture was then stirred for about 1 hour at room temperature. Next, the stirring was stopped; solids were allowed to settle; the supernatant liquid was removed by siphoning; the solids were resuspended in about 100 ml of heptane and stirred for several minutes. This process was repeated twice for a total of 3 washes. Then, 2.5 ml of a 1 M solution of 1-butanol in heptane was added and the mixture was stirred for about 1 hour at room temperature. To this mixture was added 2.5 ml of 1 M $TiCl_4$ in heptane and the resultant solution was stirred for about 1 hour at room temperature. After this time period, the stirring was stopped, the solids were allowed to settle and the liquid was removed by siphoning. The catalyst, Catalyst E, was then dried in vacuo.

Catalyst F was prepared as above but without any washing step. Polymerization was conducted as described in Example XXIV. The results of using these two catalysts are shown in the following table:

| Catalyst | Activity (g PE/g cat.-hr) | MI | MIR | Bulk Density | Rate Decay Constant ($K_d$) |
|---|---|---|---|---|---|
| E | 108 | 0.17 | 31.8 | N.A. | N.A. |
| F | 6591 | 0.25 | 32.2 | 0.27 | −0.002 |

As the results show, the washed catalyst that contained EVA as the support had a significantly lower activity (108 g PE/g Cat. hr) compared with the unwashed catalyst (6591 g PE/g Cat. hr). The loss of activity is probably due to less bonding or impregnation of dialkylmagnesium compounds in EVA particles.

EXAMPLE XXVI

These examples show that, when conditions are such that a significant amount of magnesium species can be bonded to an EVA support, washing after contacting with a dialkylmagnesium compound can be advantageous. Two catalysts were prepared in this example. Catalyst G was washed after treatment with a dialkylmagnesium compound whereas Catalyst H was not.

Catalyst Preparation:

Five grams of a microfine EVA copolymer powder (mean particle diameter of about 9 microns; 8 weight % vinyl acetate) was suspended in approximately 100 ml of dry, deoxygenated heptane while stirring. To this suspension was added 5 ml of MAGALA BEM (0.63 M) and the thus formed mixture was stirred for about 1 hour at room temperature. After this period of time, stirring was stopped and the mixture was filtered. The solids were resuspended in about 100 ml of heptane and stirred for several minutes. This process was repeated. Then, 2.5 ml of a 1 M solution of butanol in heptane was added and allowed to react for about 1 hour with continuous stirring at room temperature. After this period of time, 2.0 ml of a 1 M solution of $TiCl_4$ in heptane were added and the mixture was allowed to react for about 1 hour at room temperature. Next, the catalyst, Catalyst G, was dried in vacuo.

Catalyst H was prepared as Catalyst G except that no washing step was employed. The polymerization reactions using Catalysts G and H were performed using the procedure described in Example XXIII.

The result of the polymerization reaction are shown in the following table:

| Catalyst | Activity (g PE/g Cat. hr.) | MI | MIR | Bulk Density |
|---|---|---|---|---|
| G | 3772 | 0.19 | 33.1 | 0.36 |
| H | 1765 | 0.09 | 38.4 | 0.22 |

In this example, washing increased catalyst activity, MI potential and bulk density compared to the unwashed catalyst. It is noted that in these examples the EVA support had a significant smaller mean particle size (9 microns) as compared to the support employed in Example XXV (47 microns). Smaller particle size of the support means that more magnesium can be bonded to the support. Thus, when employing EVA as a support, the mean particle size of the support must be maintained low enough in order to observe the benefits of the washing step.

EXAMPLE XXVII

These examples illustrate the advantages obtained when the catalyst of the present invention is modified by treatment with an alcohol. Specifically, the following four catalysts were prepared and then used to polymerize ethylene:

Catalyst I: Five grams of a microfine EMA copolymer powder (sieved, 37 to 75 microns diameter; 17.4 wt. % methyl acrylate) was suspended in about 100 ml of dry, deoxygenated heptane while stirring. To this suspension was added 5 ml of MAGALA 7.5E and the thus formed mixture was stirred for about 1 hour at room temperature. Next, 2.5 ml of 1 M solution of $TiCl_4$ in heptane was added and allowed to react for about 1 hour at room temperature. After addition of the $TiCl_4$ solution, the catalyst was dried in vacuo.

Catalyst J was prepared using the procedure described above for Catalyst I except that after the addition of MAGALA, n-butanol (0.5 and 1.0 mmol, respectively) was added and that mixture was allowed to react for about 1 hour at room temperature prior to any addition of $TiCl_4$.

Catalyst K: Five grams of a microfine EVA copolymer powder (mean particle diameter of about 47 microns; 9 wt. % vinyl acetate) were suspended in about 100 ml of dry, deoxygenated heptane while stirring. To this suspension was added 5 ml of MAGALA 7.5E and the thus formed mixture was stirred for about 1 hour at room temperature. Next, 2.5 ml of 1 M solution of $TiCl_4$ in heptane were added and allowed to react for about 1 hour at room temperature. After addition of the $TiCl_4$ solution, the catalyst was dried in vacuo.

Catalyst L was prepared using the procedure described above for Catalyst K except that after the addition of MAGALA, n-butanol (0.5 and 1.0 mmol, respectively) was added and that mixture was allowed to react for about 1 hour at room temperature prior to any addition of $TiCl_4$.

The above catalysts were then used in the polymerizations of ethylene using the procedure described in Example XXVI and the results of these polymerization are shown hereinbelow.

| Catalyst | mmol BuOH/gm | Activity (g PE/g Cat. hr) | MI | MIR | Bulk Density | Rate Decay Constant ($K_d$) |
|---|---|---|---|---|---|---|
| I | 0 | 3920 | 0.18 | 38.7 | 0.244 | −0.013 |
| J | 0.5 | 2392 | 0.27 | 30.6 | 0.292 | −0.003 |
|   | 1.0 | 1285 | 0.14 | 28.6 | 0.281 | −0.003 |
| K | 0 | 2300 | 0.16 | 42.5 | 0.178 | −0.037 |
| L | 0.5 | 5478 | 0.26 | 33.8 | 0.245 | −0.016 |
|   | 1.0 | 5241 | 0.24 | 28.9 | 0.320 | −0.002 |

From the data in the above table, it can be seen that alcohol addition leads to less decay of polymerization rate as well as higher bulk density and narrower MWD of the product compared with those systems that are not modified with an alcohol. In addition, activity of the EVA supported catalyst was more than doubled by alcohol addition. In contrast, the activity of the EMA formulations decreased with alcohol modification.

EXAMPLE XXVIII

In this example, the benefits of using a polymer supported catalyst that contains both an alkyl aluminum chloride and a magnesium alkyl complex is illustrated. The supports employed in this example were either EVA (9% vinyl acetate, mean particle size diameter=47 microns) or EMA (19% methylacrylate, mean diameter=46 microns). The support particles were prepared using the dispersion process of the present invention.

Five grams of supported powder and 75 ml of dry, deoxygenated heptane were added to a 250 ml round bottom flask and stirred under a dry nitrogen atmosphere. Next, either 2.0 ml of a 25% ethyl aluminum dichloride (EADC) or 1.9 ml of 25% diethyl aluminum chloride (DEAC) solution in heptane was added. The slurry was stirred for about 1 hour and then 6.7 ml of MAGALA 7.5E (7:1 di-n-butylmagnesium triethylaluminum complex) was added. For a comparison, a catalyst containing no alkyl aluminum chlorides was prepared. After an additional hour of stirring, 2.5 ml of a 1 M solution of n-butanol in heptane was added and the resultant mixture was stirred for an additional hour. Next, 2.2 ml of a 1.1 M solution of $TiCl_4$ in heptane was added. After 1 hour the stirring was stopped, the solids allowed to settle and the liquid was removed by siphoning followed by vacuum drying. Unless otherwise noted in the table below, all catalyst preparations were at room temperature.

Each of the above formed catalysts was then used in the polymerization of ethylene. Specifically, ethylene was polymerized in a 1 liter stainless steel reactor wherein isobutane (500 ml), TEAL (0.5 ml of 25% solution in heptane), hydrogen (180 mmol), catalyst (20 mg) and ethylene were added into the reactor. The temperature of the polymerization reactions was conducted at 80° C. Ethylene was fed on demand during the polymerization to maintain a total pressure of 500 psi. The polymerization was terminated after about 1 hour by venting the reactor to remove ethylene and isobutane and the solid polyethylene was recovered. The results of the polymerizations are summarized below.

| Support | Al Alkyl | Activity (g PE/g cat. hr) | MI | MIR | Bulk Density |
|---------|----------|---------------------------|------|-----|--------------|
| EVA | none | 4930 | 0.16 | 32 | 0.24 |
| EVA | EADC | 6689 | 0.54 | 28 | 0.22 |
| EVA* | none | 2620 | 0.59 | 32 | 0.3 |
| EVA* | EADC | 3640 | 0.73 | 30 | 0.36 |
| EMA | none | 1460 | 0.2 | 32 | 0.34 |
| EMA | EADC | 1040 | 0.37 | 33 | 0.18 |
| EMA | DEAC | 4600 | 0.23 | 32 | 0.31 |

*Denoted catalyst prepared at 50° C.

The above data shows that the use of the combination of an alkyl aluminum chloride compound and an alkyl magnesium complex in a supported catalyst provides enhanced activity and increased melt index (MI) to the polymer product compared with a catalyst which does not contain a combination of an alkyl aluminum chloride compound and an alkyl magnesium complex.

EXAMPLE XXIX

To further illustrate the advantages that are obtained using a catalyst that contains both an alkyl aluminum chloride compound and an alkyl magnesium complex, the following experiment was conducted. In this example, catalysts containing an alkyl magnesium complex (MAGALA) and either EADC or DEAC were employed and compared to a catalyst that contained an alkyl aluminum compound and an alkyl magnesium complex. These catalyst were prepared in accordance with the procedure described in Example XXVIII using EVA as the support except that the catalyst preparation temperature was 50° C. in all instances and twice as much n-butanol (5 ml of 1 M solution in heptane) was employed.

Each of the thus formed catalysts was then used in the polymerization of ethylene using the conditions set forth in the previous example. The results of the polymerization are summarized below. As the data indicates, the catalysts that contained the alkyl aluminum chloride compounds (DEAC or EADC) had higher catalytic activity compared to one that contained an alkyl aluminum compound (TEAL). Moreover, from visual inspection, the polymers produced from the catalysts containing DEAC and EADC had uniform particle morphology compared to the one that contained TEAL.

| Al Alkyl Compound | Activity (g PE/g cat. hr) | MI | MIR | Bulk Density |
|-------------------|---------------------------|------|-----|--------------|
| EADC | 3900 | 0.83 | 30 | 0.34 |
| DEAC | 2989 | 0.66 | 30 | 0.31 |
| TEAL | 694 | 0.66 | 29 | NA |

The above preferred embodiments and examples are given to illustrate the scope and spirit of the invention. These embodiments and examples will make apparent to those skilled in the art other embodiments and examples, which are also within the contemplation of the present invention. Therefore, the present invention should be limited only by the appended claims.

What is claimed:

1. A process for preparing a polymer supported Ziegler-Natta catalyst component comprising:
    (a) providing a particulate olefin copolymer support comprised of discrete particles that are spherical or substantially spherical having a median particle size ranging from about 1 up to about 500 microns, a pore volume less than 0.1 cc/g and a surface area of less than 15 m²/g, a melt index of about 1 up to about 125 g/10 min. and comprising from about 50.1 to about 99.9 weight percent $C_{2-3}$ α-olefin and from about 0.1 to about 49.9 weight percent of a monomer selected from the group consisting of a vinyl ester and an acrylate;
    (b) contacting said particulate olefin copolymer support with an organometallic compound, complex or mixture thereof under conditions effective to form a catalyst precursor;
    (c) washing the catalyst precursor with an organic solvent; and
    (d) contacting said washed catalyst precursor produced in step (c) with a transition metal, a transition metal compound or mixture thereof under conditions effective to produce a supported catalyst.

2. The process of claim 1 further comprising the step of contacting an alcohol with the washed precursor compound prior to step (d).

3. The process of claim 2 wherein said alcohol is selected from the group consisting of ethanol, methanol, n-propanol, i-propanol, n-butanol, i-butanol, and n-pentanol.

4. The process of claim 3 wherein said alcohol is n-butanol.

5. The process of claim 1 wherein said vinyl ester is vinyl acetate, vinyl propionate, vinyl butyrate, vinyl pentanoate or vinyl hexanoate.

6. The process of claim 1 wherein said acrylate has the formula

wherein R is hydrogen or methyl and $R^1$ is an alkyl group having from about 1 to about 12 carbon atoms or an aryl group having from about 6 to about 12 carbon atoms.

7. The process of claim 6 wherein said acrylate is methyl acrylate.

8. The process of claim 1 wherein said olefin copolymer contains from about 70 to about 99 weight percent $C_{2-3}$ α-olefin and from about 1 to about 30 weight percent of said monomer.

9. The process of claim 8 wherein said olefin copolymer contains from about 80 to about 97 weight percent ethylene and from about 3 to about 20 weight percent of said monomer.

10. The process of claim 1 wherein said olefin copolymer is selected from the group consisting of ethylene-methyl acrylate, ethylene-ethyl acrylate, ethylene vinyl acetate and ethylene-n-butyl acrylate copolymers.

11. The process of claim 10 wherein said olefin copolymer is ethylene-methyl acrylate or ethylene vinyl acetate.

12. The process of claim 1 wherein said particulate olefin copolymer support is obtained by:
    (i) heating the olefin copolymer to a temperature above its melting point in the presence of a block copolymer of ethylene oxide and propylene oxide and a polar liquid medium which is not a solvent for the olefin copolymer, wherein said block copolymer is present in an amount of from about 4 to about 50 percent, based on the weight of the olefin copolymer, and the weight ratio of said polar liquid medium to said olefin copolymer is in the range from about 0.8:1 to about 9:1;

(ii) dispersing the heated product of step (i) under conditions effective to provide particles defining the copolymer of step (a) when said dispersion is cooled below the melting point of said olefin copolymer; and (iii) cooling the dispersion to below the melting point of the olefin copolymer to produce said particulate olefin copolymer support.

13. A process for preparing a polymer supported Ziegler-Natta catalyst component comprising:

(a) providing a particulate olefin copolymer support comprised of discrete particles that are spherical or substantially spherical having a median particle size ranging from about 1 up to about 500 microns, a pore volume less than 0.1 cc/g and a surface area of less than 15 $m^2/g$, a melt index of about 1 up to about 125 g/10 min. and comprising from about 50.1 to about 99.9 weight percent $C_{2-3}$ α-olefin and from about 0.1 to about 49.9 weight percent of a monomer selected from the group consisting of a vinyl ester and an acrylate;

(b) contacting said particulate olefin copolymer support with an organomagnesium compound or complex and an alkyl aluminum halide compound under conditions effective to form a catalyst precursor;

(c) contacting said catalyst precursor with an alcohol; and (d) contacting said alcohol-modified catalyst precursor produced in step (c) with a transition metal, a transition metal compound or mixture thereof under conditions to produce a supported catalyst.

14. The process of claim 13 wherein said alkyl aluminum halide is selected from the group consisting of ethyl aluminum dichloride, diethyl aluminum chloride, and ethylaluminum sesquichloride.

15. The process of claim 14 wherein said alkyl aluminum halide is ethyl aluminum dichloride or diethyl aluminum chloride.

16. The process of claim 13 wherein said organomagnesium complex comprises an alkyl magnesium compound and alkyl aluminum compound.

17. The process of claim 16 wherein said alkyl magnesium compound is dibutylmagnesium and said alkyl aluminum compound is triethylaluminum.

18. The process of claim 13 wherein step (b) comprises contacting said particulate olefin support with an alkyl aluminum halide compound and then contacting that product with an organomagnesium compound or complex.

19. The process of claim 13 wherein said particulate olefin copolymer support is obtained by:

(i) heating the olefin copolymer to a temperature above its melting point in the presence of a block copolymer of ethylene oxide and propylene oxide and a polar liquid medium which is not a solvent for the olefin copolymer, wherein said block copolymer is present in an amount of from about 4 to about 50 percent, based on the weight of the olefin copolymer, and the weight ratio of said polar liquid medium to said olefin copolymer is in the range from about 0.8:1 to about 9:1;

(ii) dispersing the heated product of step (i) under conditions effective to provide particles defining the copolymer of step (a) when said dispersion is cooled below the melting point of said olefin copolymer; and (iii) cooling the dispersion to below the melting point of the olefin copolymer to produce said particulate olefin copolymer support.

* * * * *